(12) United States Patent
Galbreath et al.

(10) Patent No.: US 10,160,357 B2
(45) Date of Patent: Dec. 25, 2018

(54) SEAT ASSEMBLY HAVING IMPROVED TRIM APPEARANCE AND METHOD AND TOOL FOR MAKING THE SAME

(71) Applicant: LEAR CORPORATION, Southfield, MI (US)

(72) Inventors: Ashford A. Galbreath, Troy, MI (US); Asad S. Ali, Troy, MI (US); Gregory Alan Lymburner, Carleton, MI (US); Paul S. Severinski, Brownstown, MI (US); Gary Rock, Canton, MI (US); James B. Clauser, Oakland Township, MI (US); Louella Ann Patterson, Goodells, MI (US); Thomas A. Welch, Sr., Ortonville, MI (US)

(73) Assignee: LEAR CORPORATION, Southfield, MI (US)

( * ) Notice: Subject to any disclaimer, the term of this patent is extended or adjusted under 35 U.S.C. 154(b) by 96 days.

(21) Appl. No.: 14/397,611

(22) PCT Filed: Feb. 8, 2013

(86) PCT No.: PCT/US2013/025339
§ 371 (c)(1),
(2) Date: Oct. 28, 2014

(87) PCT Pub. No.: WO2013/169319
PCT Pub. Date: Nov. 14, 2013

(65) Prior Publication Data
US 2015/0175042 A1 Jun. 25, 2015

Related U.S. Application Data

(60) Provisional application No. 61/643,620, filed on May 7, 2012.

(51) Int. Cl.
*B60N 2/58* (2006.01)
*B29C 44/02* (2006.01)
(Continued)

(52) U.S. Cl.
CPC ............ *B60N 2/5825* (2013.01); *B29C 44/02* (2013.01); *B60N 2/5891* (2013.01); *B60N 2/64* (2013.01); *B29L 2031/3002* (2013.01)

(58) Field of Classification Search
CPC ......... A47C 31/11; A47C 7/40; B60N 2/5825; B60N 2/70
(Continued)

(56) References Cited

U.S. PATENT DOCUMENTS 3,630,572 A * 12/1971 Homier .................... A47C 7/18
297/218.1
4,317,591 A 3/1982 Ramsey
(Continued)

FOREIGN PATENT DOCUMENTS

CN 101357599 A 2/2009
DE 4219943 C1 2/1993
(Continued)

OTHER PUBLICATIONS

PCT International Search Report dated Apr. 4, 2013, Application No. PCT/US2013/025339, Applicant Lear Corporation, 2 Pages.
(Continued)

*Primary Examiner* — Sarah B McPartlin
(74) *Attorney, Agent, or Firm* — Brooks Kushman P.C.

(57) ABSTRACT

A seat assembly having improved trim appearance is provided as well as a method and mold tool for making the seat assembly. In certain embodiments, the seat assembly has at least one narrow trench having a substantially constant width of up to 5 mm, which provides for better tolerances when installing a trim cover on the cushion and provides
(Continued)

improved appearance and comfort. In certain embodiments, the mold tool has at least one tool insert that is configured to create the at least one narrow trench with a substantially constant width in the cushion.

17 Claims, 4 Drawing Sheets

(51) Int. Cl.
   *B60N 2/64* (2006.01)
   *B29L 31/30* (2006.01)
(58) Field of Classification Search
   USPC ..... 297/218.1, 218.3, 218.5, 452.48, 452.58, 297/452.59, 452.6
   See application file for complete search history.

(56) References Cited

U.S. PATENT DOCUMENTS

| | | | |
|---|---|---|---|
| 5,605,373 A | 2/1997 | Wildern, IV et al. | |
| 5,733,001 A * | 3/1998 | Roberts | B60N 2/5825 24/297 |
| 5,971,478 A * | 10/1999 | Hurite | B60N 2/5833 24/442 |
| 6,199,252 B1 * | 3/2001 | Masters | B60N 2/0224 29/469 |
| 6,299,255 B1 * | 10/2001 | Pichon | B60N 2/5825 297/218.5 |
| 6,443,525 B1 | 9/2002 | Haupt | |
| 6,838,155 B2 | 1/2005 | Cappucci et al. | |
| 7,287,305 B2 * | 10/2007 | Bednarski | B60N 2/5825 24/297 |
| 7,481,489 B2 * | 1/2009 | Demick | B60N 2/5825 297/218.1 |
| 7,487,575 B2 * | 2/2009 | Smith | B60N 2/5825 24/297 |
| 7,506,939 B2 * | 3/2009 | Brockschneider | B60N 2/5825 297/218.2 |
| 7,568,761 B2 * | 8/2009 | Mashimo | B68G 7/052 297/218.1 |
| 7,681,949 B2 | 3/2010 | Nathan et al. | |
| 7,837,263 B2 * | 11/2010 | Booth | A47C 7/20 297/218.1 |
| 7,901,002 B2 * | 3/2011 | Mashimo | B60N 2/5825 297/218.3 |
| 7,937,815 B2 | 5/2011 | Hamilton et al. | |
| 7,946,649 B2 | 5/2011 | Galbreath et al. | |
| 8,091,184 B2 | 1/2012 | Santin et al. | |
| 8,128,166 B2 * | 3/2012 | Hoshina | B60N 2/585 297/218.3 |
| 8,398,174 B2 * | 3/2013 | Hofmann | B60N 2/5825 297/218.1 |
| 8,752,902 B2 * | 6/2014 | Labish | B68G 7/12 297/218.2 |
| 8,857,018 B2 * | 10/2014 | Murasaki | A47C 31/023 24/297 |
| 8,998,310 B2 * | 4/2015 | Lovasz | A47C 31/023 297/123 |
| 2002/0101109 A1 | 8/2002 | Stiller et al. | |
| 2002/0117882 A1 * | 8/2002 | Takezawa | B60N 2/5825 297/218.1 |
| 2003/0042773 A1 * | 3/2003 | Stiller | A47C 31/026 297/218.3 |
| 2003/0162008 A1 | 8/2003 | Cappucci et al. | |
| 2003/0215601 A1 | 11/2003 | Pedde et al. | |
| 2005/0006944 A1 | 1/2005 | Ali et al. | |
| 2007/0017080 A1 | 1/2007 | Hamilton et al. | |
| 2009/0033131 A1 | 2/2009 | Clauser et al. | |
| 2009/0085384 A1 * | 4/2009 | Galbreath | B60N 2/5825 297/218.1 |
| 2009/0295215 A1 | 12/2009 | Galbreath et al. | |
| 2010/0177434 A1 | 5/2010 | Galbreath et al. | |
| 2011/0227390 A1 | 9/2011 | Lovasz | |
| 2013/0071606 A1 | 3/2013 | Billarant et al. | |
| 2013/0119730 A1 * | 5/2013 | Nakagawa | B60N 2/58 297/218.1 |
| 2015/0210189 A1 * | 7/2015 | Funaki | B60N 2/28 297/250.1 |

FOREIGN PATENT DOCUMENTS

| | | |
|---|---|---|
| DE | 10019798 A1 | 11/2001 |
| DE | 10034088 A1 | 1/2002 |
| DE | 102005050755 A1 | 4/2007 |
| EP | 2471416 A1 | 7/2012 |
| FR | 2679895 A1 | 2/1993 |
| JP | 2008113811 A | 5/2008 |
| WO | 02092311 A1 | 11/2002 |
| WO | 2011089333 A1 | 7/2011 |

OTHER PUBLICATIONS

PCT International Preliminary Report on Patentability and Written Opinion dated Nov. 11, 2014, Application No. PCT/US2013/025339, Applicant Lear Corporation, 8 Pages.
Chinese Office Action dated Dec. 18, 2015, Application No. 201380022807.9, 8 Pages.
German Office Action dated Jan. 19, 2014, Application No. 11 2013 002 351.2, Applicant Lear Corporation, 9 Pages.
Chinese Third Office Action dated May 17, 2017, Application No. 201380022807.9, Applicant Lear Corporation, 6 Pages.

* cited by examiner

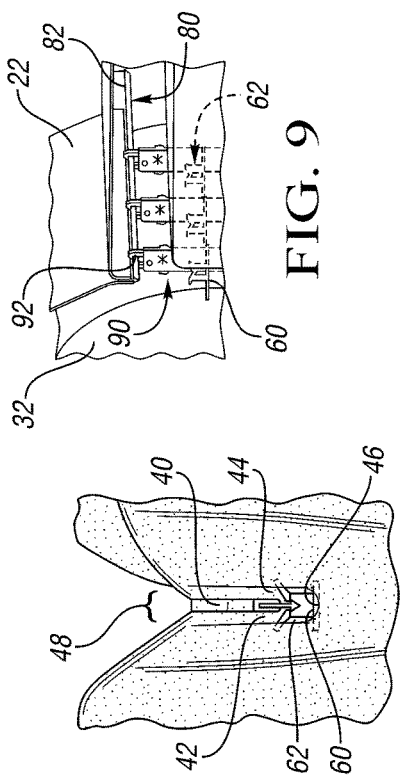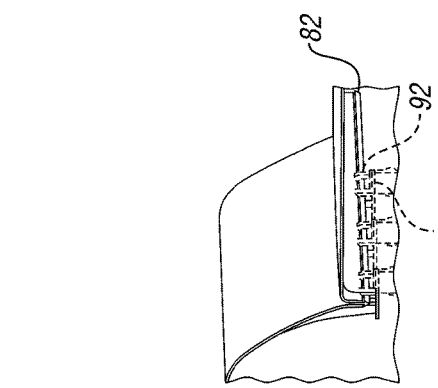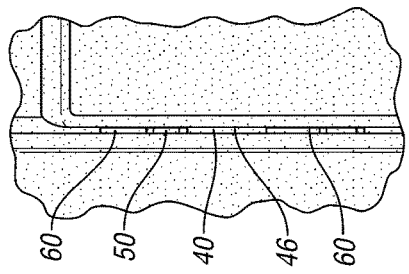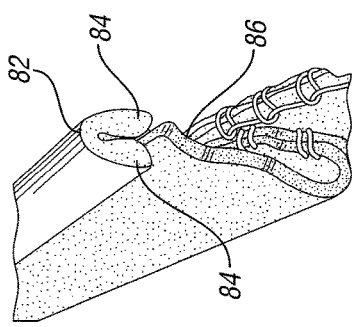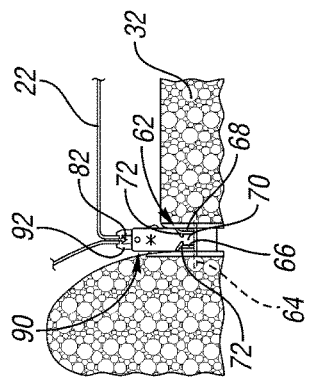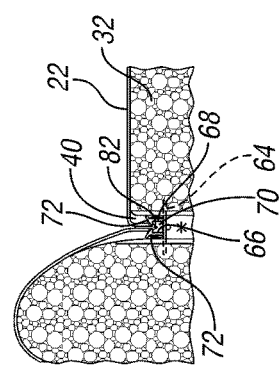

SEAT ASSEMBLY HAVING IMPROVED TRIM APPEARANCE AND METHOD AND TOOL FOR MAKING THE SAME

CROSS-REFERENCE TO RELATED APPLICATIONS

This application is the U.S. national phase of PCT Application No. PCT/US2013/025339 filed on Feb. 8, 2013, which claims the benefit of U.S. Provisional Application No. 61/643,620 filed on May 7, 2012, the disclosure of which are incorporated in their entirety by reference herein.

TECHNICAL FIELD

The present disclosure relates, in at least certain embodiments, to a seat assembly having improved trim appearance and a method and tool for making the same.

BACKGROUND

Vehicle seats generally include a seat lower cushion and a seat back cushion, each having a trim cover disposed thereon. The trim covers may be attached in trenches defined within the cushions, for example via a hog ring assembly, hook and loop fasteners, or by manual attachment to clips disposed within the cushions. In conventional cushions, the trenches are at least 15 mm or greater in width to accommodate the assembly process. These trenches are often located in areas of the cushion that receive a substantial load from the passenger.

SUMMARY

In at least one embodiment, a cushion assembly is provided. The cushion assembly may include a cushion having a top surface and a bottom surface, the top surface being configured to receive a trim cover and having defined therein at least one trench having first and second opposing side walls and a bottom wall. The first and second side walls may have a substantially constant width therebetween of up to about 5 mm. At least two trim clips may be spaced apart in the substantially constant width trench, the trim clips being at least partially embedded in the bottom wall of the trench and having a trim cover attachment member projecting into the trench to be engagable with an attachment member of the trim cover.

In at least one embodiment, a mold tool is provided. The mold tool may include a first mold half and a second mold half, the first and second mold halves forming a mold cavity when closed. At least one elongated tool insert may be attached to one of the first mold half and the second mold half, the at least one tool insert having a base and a protruding portion extending from the base, the protruding portion having a first side wall and a second side wall and a tip. The protruding portion may have a substantially constant width between the first and second side wall of up to about 5 mm along substantially an entire length of the elongated tool insert and be configured to form a trench in a molded part having a substantially constant width of up to about 5 mm.

In at least one embodiment, a cushion assembly is provided. The cushion assembly may include a cushion having a top surface and a bottom surface, the top surface being configured to receive a trim cover and having defined therein at least one trench having first and second opposing side walls and a bottom wall. The first and second side walls may have a substantially constant width therebetween of up to about 5 mm. At least two clips may be spaced apart in the substantially constant width trench and at least partially embedded in the bottom wall of the trench, each of the clips having a trim cover attachment member projecting into the trench to be engagable with an attachment member of the trim cover. At least one slit may be defined in the bottom wall of the trench adjacent to each of the at least two clips, the slit extending from the bottom wall of the trench through to the bottom surface. At least one tapered access hole may be defined in the bottom surface of the cushion juxtaposed with the slit to allow a tool to have access to the slit, the access hole having a diameter that increases in a direction from the slit towards the bottom surface.

BRIEF DESCRIPTION OF THE DRAWINGS

FIG. 5 is an enlarged view of a portion of a trench according to at least one embodiment;

FIG. 6 is a side view of a trench according to at least one embodiment;

FIG. 7 is a bottom view of a trim cover according to at least one embodiment;

FIG. 8 is a perspective view of an okie according to at least one embodiment;

FIG. 9 is a perspective schematic view of a coupling system engaging an okie according to at least one embodiment;

FIG. 10 is a perspective schematic view of a coupling system coupling an okie to clips in a seat cushion according to at least one embodiment;

FIG. 11 is a side schematic view of a coupling system engaging an okie according to at least one embodiment;

FIG. 12 is a side schematic view of a coupling system coupling an okie to clips in a seat cushion according to at least one embodiment;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in the description are to be enlisted as modified by the word "about" in describing the broader scope of the invention. Practice within the numerical limit stated is generally preferred. Also, unless expressly stated to the contrary, the description of a group or class of materials is suitable or preferred for a given purpose in connection with the invention implies that mixtures of any two or more members of this group or class may be equally suitable or preferred.

Figure 1:
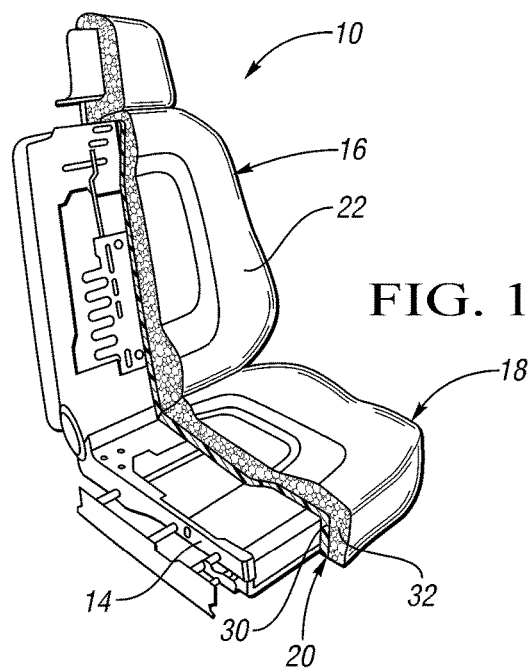
FIG. 1 is a perspective sectioned view of a vehicle seat in accordance with one embodiment.

Referring to FIG. 1, a vehicle seat assembly 10 is illustrated. While the vehicle seat assembly 10 is illustrated in FIG. 1 to be a bucket seat assembly, it should be understood that the principles of the invention are applicable to other types of seat assemblies, such as bench, captain and other types of seat assemblies. It should also be understood that the principles of the present invention are applicable to other configurations where foam is a component, such as backrests, back support pads, armrests, and head restraints. Still further, it should be understood that the principles of this invention are applicable to all types of vehicle seat assemblies. Furthermore, it should be understood that the teachings of the multiple embodiments are not limited to applications on automobiles but may be employed on any type of vehicle including, without limitation, aircraft, watercraft, spacecraft, and other types of landcraft including trains as well as non-vehicle seat assemblies.

As shown in FIG. 1, the vehicle seat assembly 10 typically includes a seat frame, generally indicated at 14 having a plurality of mounting brackets (not shown) adapted to operatively secure the seat frame 14 within a vehicle (not shown). The seat frame 14 may be constructed from any materials suitable for application within a vehicle seat assembly 10, such as aluminum, steel or other metal alloy, composite material, or a suitable polymer. Further, the seat frame 14 may be manufactured using techniques commonly known in the art, and relative to the type of material employed. By way of example, the manufacturing techniques may include stamping, welding, fastening or molding a suitable material to form the seat frame 14.

The vehicle seat assembly 10 also includes a seat back, generally indicated at 16 and a lower seat assembly, generally indicated at 18. In at least the illustrated embodiment, the seat back 16 and the lower seat assembly 18 each have the same type of cushion assembly 20 covered by a trim material 22. However, it should be understood that the configuration and/or type of the cushion assembly 20 for the seat back 16 can differ from the configuration and/or type of the cushion assembly 20 of the lower seat assembly 18. Likewise, it should be understood that the trim material 22 for the seat back 16 can differ from the trim material for the lower seat assembly 18. As can be seen in FIG. 1, the cushion assembly 20 may include a structural member 30, in at least the illustrated embodiments, disposed over frame 14 and a cushion 32 that is disposed over the structural member 30. The cushion assembly 20 could include other optional layers such as a comfort pad. In at least certain embodiments, however, the cushion assembly 20 does not include a structural member 30 and comprises the cushion 32 which is disposed on the frame 14 with the trim material 22 disposed over the cushion 32.

If present, the structural member 30 can be any suitable structural foam material. In at least one embodiment, suitable structural materials will have a rigidity that is higher than conventional polyurethane foam. In at least one embodiment, the structural member 30 comprises a molded expanded polyolefin (EPO) layer. While the structural member 30 can have any suitable size and configuration, in at least one embodiment, the structural member 30 has an average thickness of 5 to 100 mm, in other embodiments of 20 to 70 mm, and in yet other embodiments of 30 to 50 mm.

The cushion 32 can comprise any suitable cushion material, such as a suitable resilient polymer. In at least one embodiment, suitable cushion materials will have a density of 24 to 96 kg/m$^3$ in another embodiment of 40 to 80 kg/m$^3$, and in yet other embodiments of 55 to 65 kg/m$^3$. Density of the cushion material can be measured by ASTM test method No. D3574. In at least one embodiment, suitable cushion materials will have a hardness of 175 N (Newtons) to 400 N, in other embodiments of 225 to 350 N, and in yet other embodiments of 275 to 325 N. Hardness of the cushion material can be measured by ASTM test method No. D3574.

In at least certain embodiments, the cushion material comprises conventional polyurethane foam. However, other types of cushion materials, such as but not limited to, soy-based foam, silicone, thermoplastic olefins, thermoplastic urethanes, and/or natural oil-based expanded polyurethanes and the like can be employed. The cushion layer 32 can be any suitable size and shape, however, in at least one embodiment, the cushion layer 32 has an average thickness of 20 to 100 mm, and in at least another embodiment of 30 to 70 mm, and in still yet other embodiments of 40 to 60 mm.

As discussed, the vehicle seat assembly 10 also includes trim material 22 which may be adapted to engage the cushion assembly 20 in a covering relationship. The trim material 22 may include any material known in the art. By way of example, some of the known materials include cloth, leather or polymers of sufficient quality and thickness for use in seat trim applications. Polymer trim materials may include a flexible close cell polymer skin material such as polyvinyl, polyvinyl chloride (PVC), polyester, nylon, thermoplastic olefin (TPO) or thermoplastic urethane (TPU). Additional materials for use as trim material 22, may include a foam backing (not shown, but generally known in the art) which may be manufactured from a variety of polymer foam materials. By way of example, the foam backing may be polyethylene, polypropylene, polyurethane, or a polystyrene foam. In at least one particularly preferred embodiment, the trim material 22 comprises polyester or nylon trim material having polyester or nylon trim fasteners (not shown) for securing the trim material 22 to one or more components (i.e., cushion 20 and/or frame 14) of the vehicle seat assembly 10.

Figure 2:
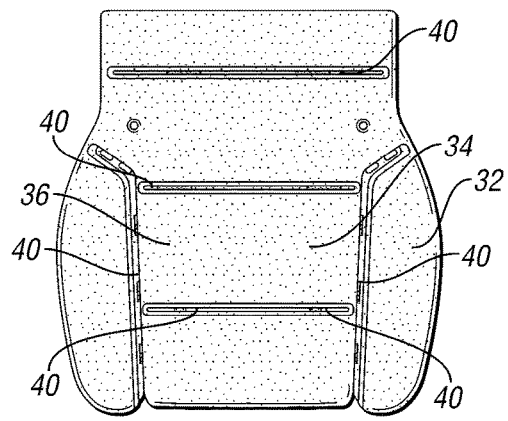
FIG. 2 is a top view of a cushion according to at least one embodiment.
Figure 3:
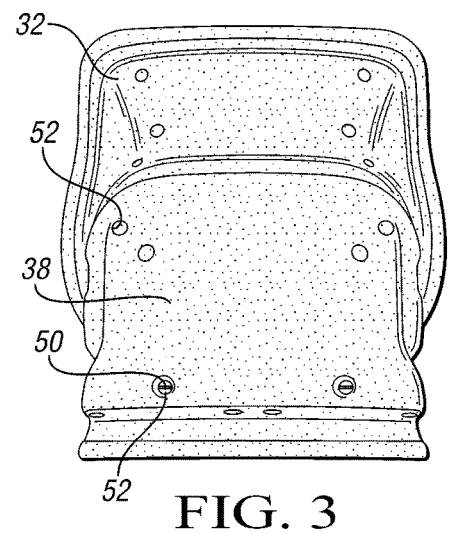
FIG. 3 is a bottom view of a cushion according to at least one embodiment.

With reference now to FIG. 2, an exemplary seat component illustrated as a seat cushion 32 for use with a seat bottom is depicted. In the illustrated embodiment, the main body 34 of the seat cushion 32 has a top surface 36, also known as an "A" surface. With reference to FIG. 3, a bottom surface 38 of the main body 34 of the seat cushion layer 32 is visible, also known as a "B" surface. With reference to FIG. 2, formed within the main body 34 is at least one trench 40. In at least one embodiment, a plurality of trenches 40 are formed in the main body 34. Each trench 40 has a first side wall 42 and an opposing second side wall 44 and a bottom wall 46. Referring to FIGS. 5 and 6, in at least one embodiment the trench 40 has a substantially uniform rectangular cross-section. However, the trench may have any suitable uniform shape.

The trench 40 has a width 48 defined between the first side wall 42 and the second side wall 44. In at least one embodiment, the width 48 is substantially constant along substantially the entire length of the trench 40. The trench width 48 may be up to 5 mm in at least one embodiment. In another embodiment, the width 48 may be from 2 mm to 4 mm. In yet another embodiment, the width 48 may be 3 mm. However, it is to be understood that the width 48 may be any suitable size. In certain embodiments, the trench 40 has a length of 5 cm to 50 cm. In another embodiment, the length is 20 cm to 45 cm. In yet another embodiment, the length is 30 cm to 40 cm. In certain embodiments, the trench 40 has a depth of 1.0 mm to 30 mm. In another embodiment, the depth is 1.5 mm to 25 mm. In yet another embodiment, the depth is 2.0 mm to 10 mm.

Figure 4:
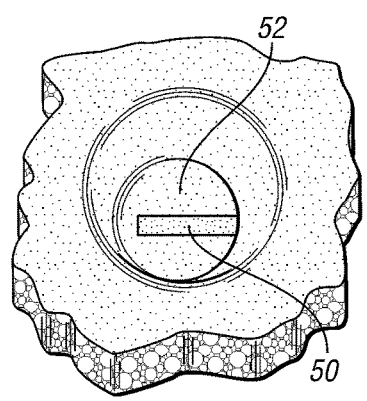
FIG. 4 is an enlarged view of an access passage according to at least one embodiment.
Figure 13:
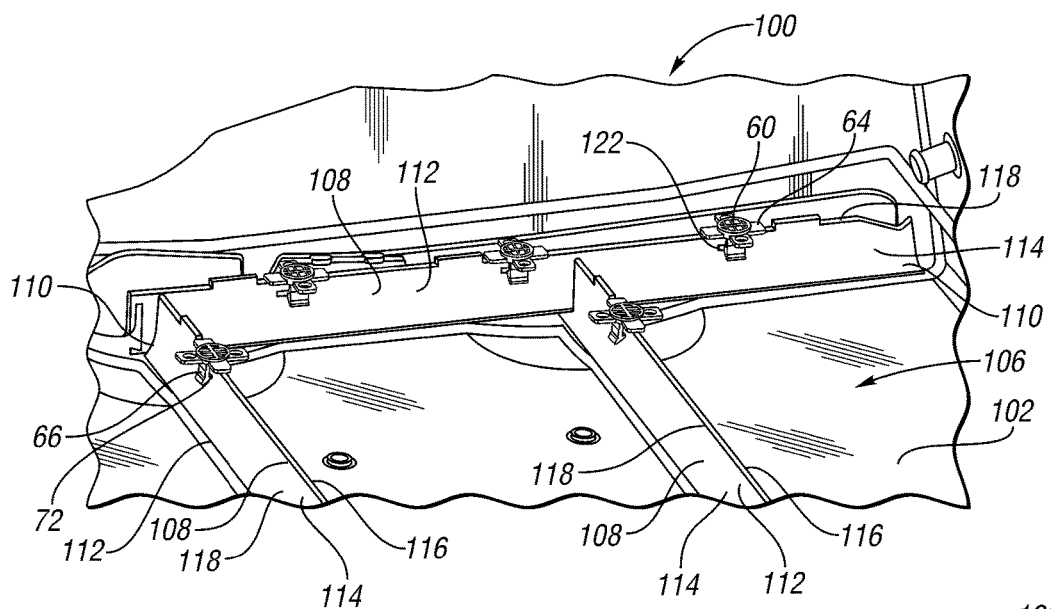
FIG. 13 is a perspective schematic view of a mold tool according to at least one embodiment.
Figure 14:
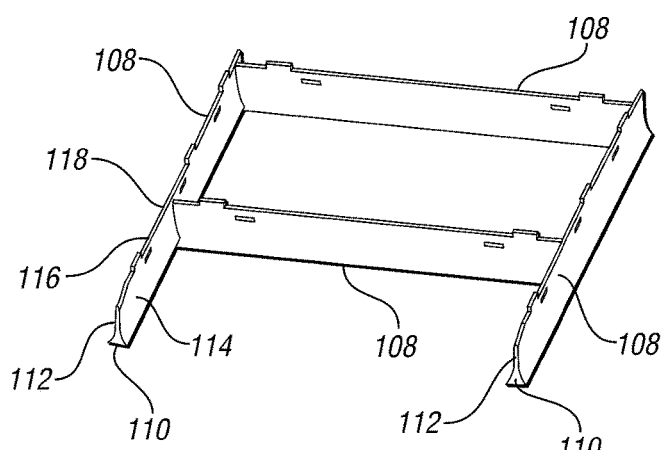
FIG. 14 is a perspective schematic view of several mold tool inserts according to at least one embodiment.
Figure 15:
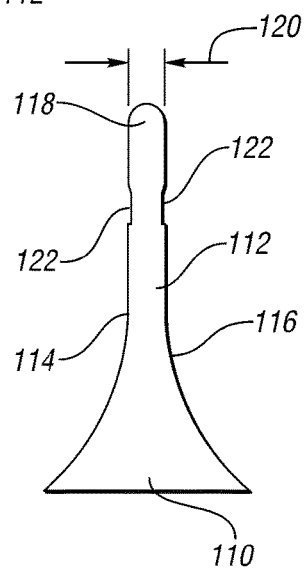
FIG. 15 is a cross-section of a mold tool insert according to at least one embodiment.
Figure 16:
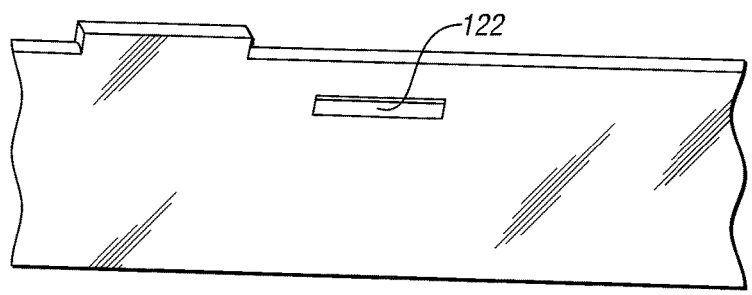
FIG. 16 is a front view of a mold tool insert according to at least one embodiment.

In at least one embodiment, as best shown in FIGS. 4 and 5, at least one slit 50, or suitable opening, is defined at the bottom of each trench 40, extending from the bottom wall 46 of the trench 40 through to the bottom surface 38. In at least certain embodiments, the slit 50 is rectangular in shape, but could be other shapes, such as cross-shaped, "x" shaped, etc. In certain embodiments, the slit 50 has a width that is substantially the same width as the trench 40. In other embodiments, the slit 50 has a width of about 1.0 mm to 5.0 mm. In another embodiment, the width is about 2.5 mm to 5.0 mm. In yet another embodiment, the width is 3.5 mm to 5.0 mm. In certain embodiments, the slit 50 has a length of 10 mm to 30 mm. In another embodiment, the length is 15 mm to 25 mm. In yet another embodiment, the length is 20 mm. In certain embodiments, the slit 50 has a depth of 1 mm to 50 mm. In another embodiment, the depth is 2 mm to 40 mm. In yet another embodiment, the depth is 5 mm to 25 mm.

In at least one embodiment, there is a plurality of slits 50 in each trench 40. In at least one embodiment, the bottom surface 38 has defined therein at least one access passage 52 juxtaposed with a slit 50 at the bottom of the trench 40 to allow a tool (described further, below) to have access to the slit 50. The access passage 52 may have any shape, but in at least one embodiment it has a circular cross-section, as shown in FIG. 4. In at least one embodiment, the access passage is tapered, such that its diameter is smallest adjacent to the slit 50 and increases towards the bottom surface 38, as also shown in FIG. 4. The access passage 52 substantially surrounds the slit 50 and in at least one embodiment there is an access passage 52 for each slit 50. It should be understood that the slit 50 could be covered by a small thickness of foam, such as 0.5 to 5.0 mm of foam, which can be broken before the tool extends therethrough or which can be broken by the tool as it extends therethrough. Furthermore, the slit 50 may be replaced by a portion of the bottom wall 46 of the trench 40 having a small thickness such that it can be broken before the tool extends therethrough or which can be broken by the tool as it extends therethrough.

Now referring to FIGS. 5 and 6, a clip 60 is at least partially embedded within the seat cushion 32. In at least one embodiment, the clip 60 is located adjacent to a slit 50. In one embodiment, the clip 60 is within 15 mm of an edge of the slit 50. In another embodiment, the clip 60 is within 10 mm of an edge of the slit 50. In another embodiment, the clip 60 is within 5 mm of an edge of the slit 50. In at least one embodiment, at least two clips 60 are spaced apart in the substantially constant width trench and are at least partially embedded in the bottom 46 of the trench 40. In certain embodiments, the trench 40 is defined as the portion of the trench between and including two clips 60. In at least one embodiment, the trench width 48 is substantially uniform along the length of the trench 40 and the depth of the trench is defined as the distance from the bottom wall 46 of the trench to a tallest point of the clip 60 extending away from the bottom wall 46. Accordingly, in this embodiment, the trench width is substantially uniform along the length of the trench 40 containing two clips 60 and from the bottom wall 46 of the trench 40 to a tallest point of the clips 60.

In at least one embodiment, the trench width 48 is substantially uniform along the length of the trench 40 for a least a certain percentage of the trench depth. In one embodiment, the trench width 48 is substantially uniform along the length of the trench 40 for at least 70% of the trench depth, defined as the distance from the bottom wall 46 of the trench 40 to the top surface 36. In another embodiment, the trench width 48 is substantially uniform along the length of the trench 40 for at least 80% of the trench depth. In yet another embodiment, the trench width 48 is substantially uniform along the length of the trench 40 for at least 90% of the trench depth. In yet another embodiment, the trench width 48 is substantially uniform along the length of the trench 40 for substantially the entire trench depth. In the foregoing embodiments, the percentage of the trench depth may be defined at the percentage of the depth starting from the bottom wall 46 of the trench 40 and extending towards the top surface 36, it may be defined at the percentage of the depth starting from the top surface 36 and extending towards the bottom wall 46 of the trench 40, or it may be defined as any percentage of the depth in between the bottom wall 46 and the top surface 36.

In at least one embodiment, at least three clips 60 are disposed in a trench 40. In certain embodiments, each clip 60 may be spaced 20 mm to 350 mm apart from an adjacent clip, including the length of each clip. In another embodiment, each clip 60 may be spaced 50 mm to 300 mm apart from an adjacent clip. In yet another embodiment, each clip 60 may be spaced 100 mm to 250 mm apart from an adjacent clip.

The clips 60 have a trim cover attachment member 62, which may either have a male or female configuration. In at least one embodiment, shown in FIGS. 5-6 and 9-13, the clip 60 has an exemplary trim cover attachment member 62 having a female configuration that is configured to receive a male attachment member 80 of the attachment member of the trim cover 22 (discussed in more detail below). In at least one embodiment, the clips include a base 64 embedded in the bottom 46 of the trench 40 such that portions of the base are within the cushion and the trim cover attachment member 62 is substantially U-shaped, having a first arm 66 and a second arm 68, each arm being at least partially disposed in one of the first side wall 42 and second side wall 44 of the trench 40. The first arm 66 and the second arm 68 form a cavity 70 for receiving the attachment member 80 of the trim cover. The first arm 66 and the second arm 68 of the trim cover attachment member 62 may each have a pair of protrusions 72 extending into the trench 40 in order to retain the attachment member 80 of the trim cover 22. In at least one embodiment, the clip 60 is completely embedded within the seat cushion 32 except for the space between arms 66 and 68.

With respect to FIGS. 7 and 8, an example of a trim cover 22 is illustrated. The trim cover 22 includes at least one attachment member 80. In at least one embodiment, the exemplary attachment member 80 is formed as an elongate bead or okie 82. Bead 82 is configured to fit within the cavity 70 in the trim cover attachment member 62. Each bead 82 includes a pair of flanges 84 which flare out from a central axis of bead 82 so as to render bead 82 too wide to fit between bead retention protrusions 72. Bead 82 also includes a trim cover engaging portion 86 which may be a portion of trim cover 22 or which may be an intermediate material used to join bead 80 to trim cover 22. In some embodiments, trim cover engaging portion 86 may be extruded with bead 82. In other embodiments, trim cover engaging portion 86 may be sewn to bead 82.

An exemplary coupling of the trim cover 22 to the cushion 32 is described with reference to FIGS. 9-12. In at least one variant, a coupling system 90 is provided for bringing the attachment member 80 of the trim cover 22 into contact with the trim cover attachment member 62 of the clip 60. In at least one embodiment, the coupling system 90 includes, in the embodiment shown, a finger 92 which extends into the access passage 52 in the bottom surface 38 of the cushion 32 and through the slit 50 adjacent to the clip 60 at least partially embedded in the bottom 46 of the trench 40. As discussed above, the finger 92 may extend through the slit 50 or may break through a portion of foam in the bottom wall 46 of the trench 40 having a small thickness to create the slit 50. The finger 92 is configured to engage the bead 82 by hooking onto the flanges 84. The finger 92 then pulls the bead 82 toward the trim cover attachment member 62 of the clip 60. The bead 82 is pulled through the protrusions 72, which deflect outward to accommodate the bead, into the cavity 70 of the trim cover attachment member 62. Once in the cavity 70, the bead 82 is held therein by the protrusions 72. In at least one embodiment, the coupling system 90 includes a plurality of fingers 92, for example one finger 92 for each clip 60.

Now referring to FIGS. 13-16, an exemplary mold tool 100 is illustrated having a first mold half 102 and a second mold half 104 (not shown). When in a closed position, the mold halves 102, 104 form a mold cavity 106 configured to receive the cushion forming material of cushion 32. The mold halves 102, 104 may come together to form any suitable shape, for example a seat cushion or a backrest. In at least one embodiment, the mold tool 100 is provided with at least one elongated tool insert 108 which may be attached to the first mold half 104, the second mold half 106, or both. While the tool insert 108 is shown in the illustrated embodiment to be a separate component that is attached to the mold tool 100, in at least certain embodiments the tool insert 108 can be integrally formed with the mold tool 100. In at least one embodiment, the tool insert 108 includes a base 110 for attaching to a mold half and a protruding portion 112 extending from the base. The protruding portion 112 has a first side wall 114 and a second side wall 116 and a tip 118. In at least one embodiment, the protruding portion 112 has a substantially constant width 120 of up to 5 mm along substantially an entire length of the elongated tool insert 108. The width 120 is defined as the distance between the first side wall 114 and the second side wall 116. In another embodiment, the width 120 is from 2 mm to 4 mm. In yet another embodiment, the width 120 is 3 mm.

The elongated tool insert 108 is configured to create the trenches 40 in the cushion 32 during the molding of the cushion 32. Accordingly, the dimensions of the trench 40 will generally correspond to the dimensions of the protruding portion 112 of the tool insert 108. In order to embed the clips 60 in the bottom 46 of the trench 40, the trim cover attachment members 62 of the clips 60 may be attached to the protruding portion 112 of the tool insert 108 prior to the molding process. In embodiments where the trim cover attachment member 62 is substantially U-shaped, having a first arm 66 and a second arm 68, the protruding portion 112 may receive one or both of the first arm 66 and the second arm 68. When the molding process is complete, the molded cushion 32 is removed from the mold tool 100 with the clips 60 being at least partially embedded in the bottom 46 of the trench 40 in the cushion 32 and are ready to receive the attachment member 80 of the trim cover 22.

In order to assist in the placement of the clips 60 on the tool insert 108, in at least one embodiment the protruding portion 112 of the tool insert 108 has defined in at least one of the first side wall 114 and second side wall 116 at least one notch 122 for receiving a protrusion 72 of the trim cover attachment member 62 of the clip 60. The notch 122 can therefore be a locating feature for attaching the trim cover attachment portion 62 of the clip 60. In at least one embodiment, the protruding portion 112 has at least one pair of notches 122 defined in the first side wall 114 and second side wall 116, with the pair of notches being juxtaposed with one another, one each on the first side wall 114 and the second side wall 116. The pair of notches 122 are configured to each accept a protrusion 72 of the trim cover attachment portion 62 of the clip 60. In at least one embodiment, the notches are rectangular in shape and have a depth from 0.1 to 0.5 mm. In another embodiment, the notches have a depth from 0.1 to 0.3 mm. In another embodiment, the notches have a depth of about 0.2 mm. However, the notches 122 may have any suitable shape and depth for receiving a protrusion 72. In at least one embodiment, each tool insert 108 has defined therein a plurality of notches or retention slots 122 for assisting the line operator with identifying proper installation in locations in the tool 100 for a corresponding plurality of clips 60. The notches 122 allow the clips 60 to snap into place on the tool insert 108, holding them in place during the molding process. The accurate positioning of the clips and the maintaining of their position during molding allows the cushion 32 to be removed from the mold without causing significant, or any, tear damage to the cushion 32. When the tool 100 is opened, the lids swing out on an arc. If clip 60 is positioned next to an area of a trench that has an increased width, as in some prior art designs, it can catch on the wider portion of the trench and produce a tear in the foam or be pulled from the foam entirely, creating a scrap pad. Reducing/eliminating these tearing and scrapping events is highly beneficial, since they account for up to 30% of the scrap produced in the molding of seat cushions, and can affect up to 0.26% of the total cushions produced.

The narrow trench width 48 of up to 5 mm is advantageous for several reasons and helps to solve several problems associated with prior art seat cushion assemblies. The narrow trench helps to control the trim cover seam alignment, which therefore results in a better appearance due to reduced variation. In conventional trenches having widths of at least 15 mm, there is substantial variation in clip placement within the trench, since the clips are narrower than the trench. This increased variation increases the potential for creating crooked seams and poorer appearance. The reduced trench width of up to 5 mm in certain embodiments greatly reduces this variation, because the clip width is very similar to the trench width. Therefore, as long as the trench is straight, the seam will be straight.

In addition, the narrower trench reduces the "read through" of the trench, or the increased pressure felt on either side of the trench by the person sitting in the seat. Certain design constraints can require that a trim cover seam be placed in areas that receive relatively high pressure in the seat cushion. A narrower trench allows for these constraints to be accommodated without reducing the comfort of the seat cushion by reducing the gap between adjacent cushion portions. The result of reduced read through is shown in FIGS. 17 and 18, which show pressure maps of a seat and back cushion for an embodiment of a cushion assembly described above and a conventional seat assembly having wide trenches and fastening with hook and loop fasteners, respectively.

Figure 17:
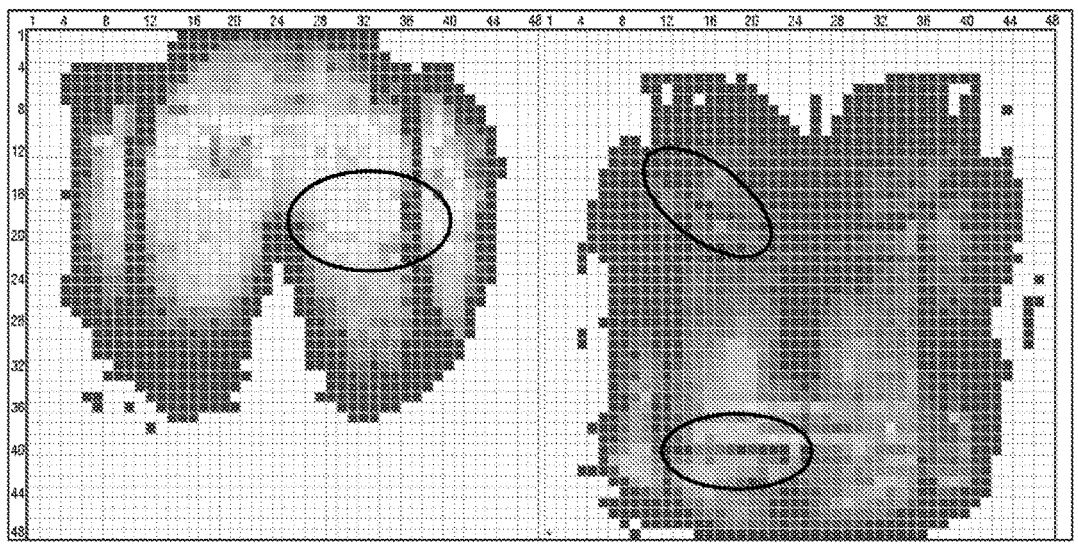
FIG. 17 is a pressure map of a seat (left) and back (right) cushion according to at least one embodiment.
Figure 18:
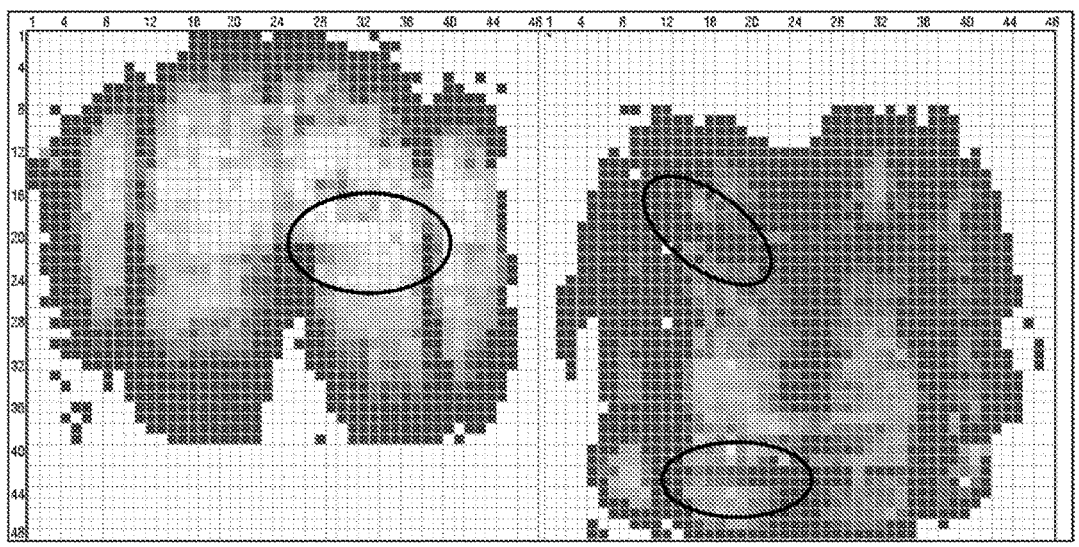
FIG. 18 is a pressure map of a seat (left) and back (right) cushion of a conventional cushion assembly using hook and loop fasteners.

FIG. 17 shows that in the embodiment having narrow trenches, the pressure map for the seat cushions are substantially unaffected by the trench. The location of the trench being tested is indicated by the area inside the black ovals. In these pressure maps, white areas indicate high pressure and black areas indicate low pressure, with gradients of gray in between. As shown in FIG. 17, the seat cushion shows no sharp lines or areas of high pressure next to areas of low pressure. In the pressure map of the seat back, only a single pixel-wide gap is seen on the bottom and diagonally on the top (as indicated by the black ovals). FIG. 18 shows that in the embodiment having wide trenches, the read through is visible as a sharp change from high pressure to low pressure along the trench in the seat cushion, as indicated by a row of all white pixels in the center of the black oval adjacent to a line of all gray pixels. In the seat back, a two pixel-wide gap is seen on the bottom and diagonally on the top. FIGS. 17 and 18 therefore show that the narrower trenches in accordance with embodiments described above have a more uniform pressure map with less extreme highs and lows compared to a conventional seat cushion assembly.

From a cost standpoint, the narrower tool inserts 108, which create narrower trenches, reduce the amount of scrap and foam damage in the seat cushions because having narrower trenches allows better material flow in the molding tool. This results in less voiding in the cushion and therefore a reduction in post-molding repair. Another advantage of the narrower trenches is that in at least some embodiments they are compatible with existing trim cover okies and coupling systems, thereby avoiding the need to completely revamp the assembly process.

In order to try to address the alignment issues discussed above, prior art cushion assemblies have used so-called "hog ring" assemblies wherein a wire is embedded in the bottom of the seat cushion and portions of the cushion are cut out to expose the wire at certain intervals. The trim cover is then manually attached to the wire using hog rings, which are fastened by hand. This practice is very labor intensive and highly repetitive, making it difficult for assembly line workers. Specifically, it is likely to lead to repetitive motion ailments such as carpal tunnel syndrome.

Applicant has avoided these repetitive motion issues by incorporating an automated system 90 to attach the trim cover to the seat assembly. Also, the notches 122 allow for easy and consistent location and attachment of the clips 60 by assembly workers. In addition, the access passages 52 had previously been substantially cylindrical, having a diameter to match the coupling tool 90. In contrast, the access passage 52 in at least one embodiment is tapered such that it decreases in diameter as it approaches the slit 50. This tapered configuration allows for easier alignment by assembly line workers by providing a larger hole in the bottom surface 38 to insert the tool 90 and it allows for easier removal of the cushion 32 from the mold tool 100.

At least some in the industry previously thought that an opening in the trench large enough to accommodate the finger 92 without distorting the foam was required to help avoid rips, tears, or cracks in the foam. Accordingly, the trenches 40 had to have a width that was at least as wide as the required access passage 52, which led to trench widths of approximately 15 mm. However, it has been discovered that providing the trench 40 with a slit 50 that has a width smaller than the finger 92 will deform to accommodate the finger 92 and not induce rips, tears, or cracks that are problematic. The trench width of the various embodiments has therefore been able to be reduced by approximately 80%, allowing for the benefits described above such as better and more consistent appearance, increased comfort, and reduced costs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:
1. A cushion assembly comprising:
a polyurethane cushion having a top surface and a bottom surface, the top surface being configured to receive a trim cover and having defined therein at least one trench having first and second opposing side walls and a bottom wall, the first and second side walls having a substantially constant width therebetween of up to about 5 mm; and
at least two trim clips spaced apart in the substantially constant width trench at least partially embedded in the bottom wall of the trench and having a trim cover attachment member projecting into the trench to be engageable with an attachment member of the trim cover,
wherein the bottom wall of the trench has defined therein at least one opening adjacent to one of the at least two trim clips and extending from the bottom wall of the trench through to the bottom surface,
wherein the bottom surface has defined therein at least one access hole juxtaposed with the opening in the bottom wall of the trench to allow a tool to have access to the opening, and
wherein the access hole has a diameter that increases in a direction from the opening towards the bottom surface.

2. The cushion assembly of claim 1, wherein the trench width is from about 2 mm to about 4 mm.

3. The cushion assembly of claim 1, wherein the trench width is about 3 mm.

4. The cushion assembly of claim 1, wherein the trim clips include a base embedded in the bottom wall of the trench and the trim cover attachment member is substantially U-shaped having a first arm and a second arm, each arm being at least partially disposed in one of the first and second side walls of the trench.

5. The cushion assembly of claim 4, wherein the first and second arms of the trim cover attachment member each have a protrusion extending into the trench to retain the attachment member of the trim cover.

6. The cushion assembly of claim 1, wherein the opening is a generally rectangular-shaped slit.

7. The cushion assembly of claim 1, wherein the width of the trench is smaller than the width of the tool such that the trench is configured to deform to receive the tool when it is inserted into the access hole.

8. The cushion assembly of claim 1, wherein at least 3 clips are spaced apart in the substantially constant width trench.

9. The cushion assembly of claim 1, wherein the clips are spaced from 50 mm to 300 mm apart.

10. The cushion assembly of claim 1, wherein the cushion and the bottom wall of the trench are made of polyurethane and the bottom wall of the trench being disposed between the top and bottom surfaces of the cushion.

11. A cushion assembly comprising:

a polyurethane cushion having a top surface and a bottom surface, the top surface being configured to receive a trim cover and having defined therein at least one trench having first and second opposing side walls and a bottom wall spaced between the top and bottom surfaces, the first and second side walls having a substantially constant width therebetween of up to about 5 mm;

at least two clips spaced apart in the substantially constant width trench and at least partially embedded in the bottom wall of the trench, each of the clips having a trim cover attachment member projecting into the trench to be engageable with an attachment member of the trim cover;

at least one slit defined in the bottom wall of the trench adjacent to each of the at least two clips, the slit extending from the bottom wall of the trench through to the bottom surface; and at least one tapered access hole defined in the bottom surface of the cushion juxtaposed with the slit to allow a tool to have access to the slit, the access hole having a diameter that increases in a direction from the slit towards the bottom surface.

12. A cushion assembly comprising:

a polyurethane cushion having a top surface and a bottom surface, the top surface being configured to receive a trim cover and having defined therein at least one trench having first and second opposing side walls and a bottom wall made of polyurethane, the first and second side walls having a substantially constant width therebetween of up to about 5 mm; and at least two trim clips spaced apart in the substantially constant width trench at least partially embedded in the bottom wall of the trench and having a trim cover attachment member projecting into the trench to be engageable with an attachment member of the trim cover;

wherein the bottom wall of the trench has defined therein at least one opening adjacent to one of the at least two trim clips and extending from the bottom wall of the trench through to the bottom surface, with the at least one opening having a width of 1-5 mm, wherein the bottom surface has defined therein at least one access hole juxtaposed with the opening in the bottom wall of the trench to allow a tool to have access to the opening, and wherein the width of the trench is smaller than the width of the tool such that the trench is configured to deform to receive the tool when it is inserted into the access hole.

13. The cushion assembly of claim 12, wherein the trench width is from about 2 mm to about 4 mm.

14. The cushion assembly of claim 12, wherein the trim clips include a base embedded in the bottom wall of the trench and the trim cover attachment member is substantially U-shaped having a first arm and a second arm, each arm being at least partially disposed in one of the first and second side walls of the trench, with the trim clips being connected to each other.

15. The cushion assembly of claim 12, wherein the opening is a generally rectangular-shaped slit.

16. The cushion assembly of claim 15, wherein the bottom surface has defined therein at least one access hole juxtaposed with the opening in the bottom wall of the trench to allow a tool to have access to the opening.

17. The cushion assembly of claim 12, the bottom wall of the trench being disposed between the top surface and the bottom surface of the cushion, and the trim cover attachment member being lockingly engageable with the attachment member of the trim cover.

* * * * *